United States Patent [19]
Penwarden

[11] 3,783,445
[45] Jan. 1, 1974

[54] VEHICLE LOCATOR SYSTEM

[75] Inventor: Kent A. Penwarden, Los Altos, Calif.

[73] Assignee: E-Systems Incorporated, Dallas, Tex.

[22] Filed: Sept. 11, 1972

[21] Appl. No.: 287,631

Related U.S. Application Data

[63] Continuation of Ser. No. 44,219, June 8, 1970, abandoned.

[52] U.S. Cl. .................................. 340/24, 178/18
[51] Int. Cl. ............................................. G08g 1/12
[58] Field of Search ...................... 340/22, 23, 24; 178/18, 19; 200/159, 46

[56] References Cited
UNITED STATES PATENTS

| | | | |
|---|---|---|---|
| 3,281,779 | 10/1966 | Yeiser .................................. | 340/23 |
| 3,308,253 | 3/1967 | Krakinowski ........................ | 178/18 |
| 3,461,454 | 8/1969 | Steckenrider ........................ | 340/24 |
| 3,128,458 | 4/1964 | Romero ............................... | 200/46 |
| 3,286,028 | 11/1966 | Gray et al. ........................... | 178/18 |

Primary Examiner—William C. Cooper
Assistant Examiner—Thomas L. Kundert
Attorney—James D. Willborn

[57] ABSTRACT

A compression type matrix switch comprising rows of parallel horizontal conductors in one plane and columns of parallel vertical conductors in a second plane parallel to the first plane and spaced therefrom by a resilient mat having apertures therethrough at the crossover points of the horizontal and vertical conductors is located behind a beat map overlay in a police patrol car. One end of each conductor is connected to a different sensor that monitors the electrical continuity between conductors at associated horizontal and vertical crossover points. The location of the car is selected for transmission to a monitor facility by firmly pressing the map at the crossover point nearest the actual location of the car. This electrically connects a pair of horizontal and vertical conductors through an aperture in the mat so that the output signals of only the two associated sensors indicate continuity at the crossover point. The outputs of all the sensors comprise a binary code signal uniquely defining the location of the car. This code signal is coupled, together with a binary code signal identifying the car, through a shift register to a transceiver for transmission to the monitor facility. Binary signals received at the monitor facility are processed in a logic circuitry for presenting on a map a visual indication of the location of the patrol car.

4 Claims, 3 Drawing Figures

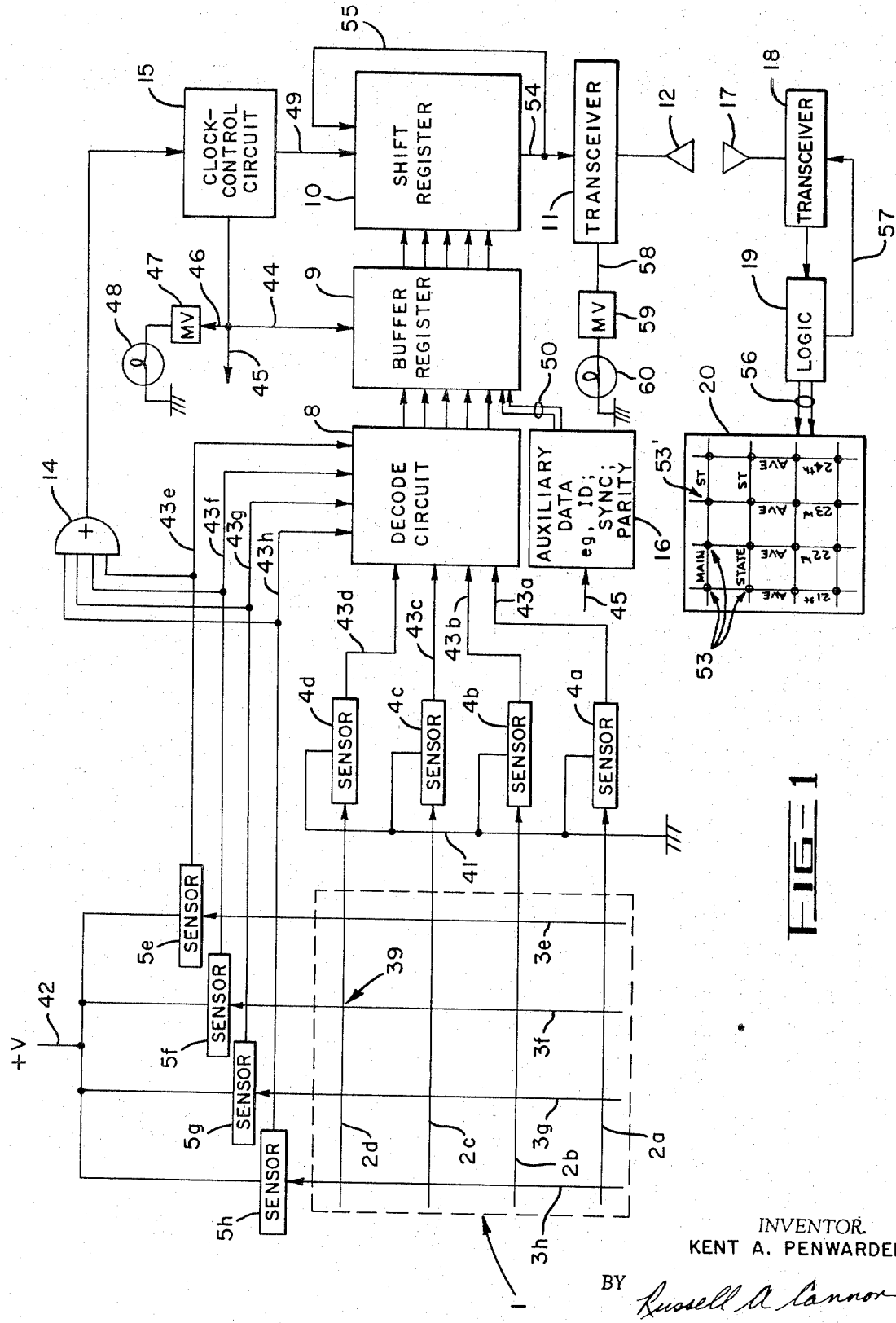

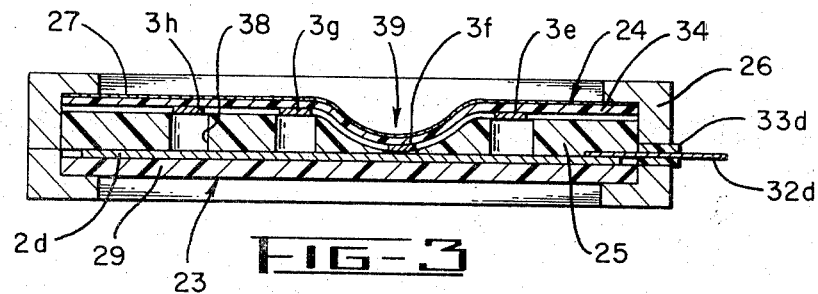
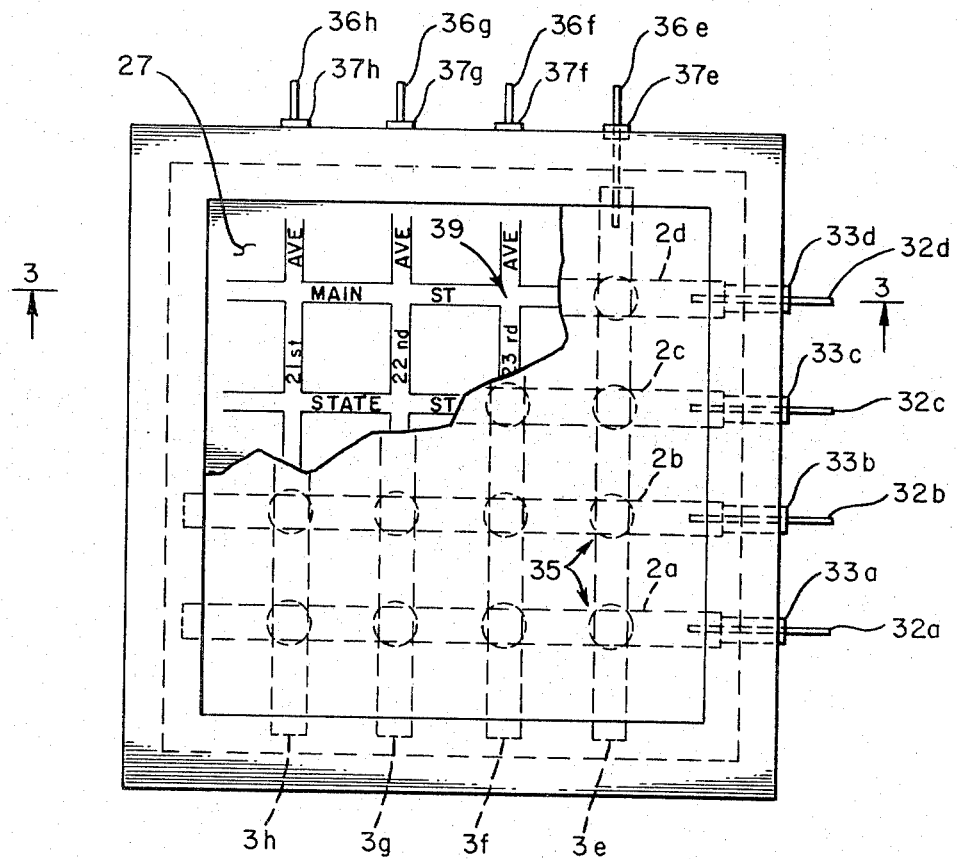

VEHICLE LOCATOR SYSTEM

This is a continuation of application Ser. No. 44,219, filed June 8, 1970 and now abandoned.

BACKGROUND OF INVENTION

The Police Department of a medium size city having a population of 300,000 may have as many as 30 police cars on duty at one time. In order to maintain a current and accurate record of the status of the location of all patrol cars, the officer in each patrol car periodically calls the dispatcher to report his location. Each of these messages is verbally acknowledged by the dispatcher who then manually enters the information on a status board. Operation in this mode crowds the available communication channels with routine messages and prevents the dispatcher addressing the more important tasks requiring his attention. One of the several prior art techniques proposed for automatically accomplishing this function is to place in each car a transmitter periodically transmitting at a unique characteristic frequency, to place several receiving antennas at different locations around the city, and to triangulate on received signals to determine a vehicle's location. Such systems are complex and expensive.

An object of this invention is the provision of a simple and inexpensive vehicle locator system.

SUMMARY OF INVENTION

A unique binary code signal identifying the location of a vehicle is selected for transmission to a monitor facility by depressing a map overlay on a compression type matrix switch at a crossover point of two conductors on the latter. The code signal is processed at the monitor facility for displaying the vehicle location.

DESCRIPTION OF DRAWINGS

FIG. 1 is a schematic and block diagram of a system embodying this invention;

FIG. 2 is a plan view of a compression type matrix switch; and

FIG. 3 is a section view of the matrix switch in FIG. 2 taken along the lines 3—3.

DESCRIPTION OF PREFERRED EMBODIMENT

Referring now to FIG. 1, circuitry in a vehicle such as a police patrol car whose location is to be relayed to a monitor facility includes a matrix switch 1 comprising crisscrossed horizontal conductors 2a–2d and vertical conductors 3e–3h; sensors 4a–4d and 5e–5h electrically connected to ends of conductors 2a–2d and 3e–3h, respectively; and, decoder circuit 8, buffer register 9, shift register 10 and transceiver 11 electrically connected in series between the outputs of the sensors and antenna 12. It will be understood that the terms "vertical" and "horizontal" are used by way of example and not by way of limitation. The outputs of sensors 5e–5h are also applied to OR gate 14 which controls the operation of clock-control circuit 15 and thus the operation of auxiliary data circuit 16. Circuitry located in the monitor facility for presenting a visual display of the location of the patrol car comprises antenna 17, transceiver 18, logic circuit 19 and display device 20.

Switch 1 is a compression type matrix switch which is shown in schematic form in FIG. 1. Referring now to FIGS. 2 and 3, the switch comprises a pair of printed circuit boards 23 and 24 that are spaced apart by a dielectric pad 25 and housed in a frame 26. The circuit boards 23 and 24 are preferably flat and located in planes that are parallel to each other. A map overlay 27 of the beat to be patrolled by the police car, for example, is placed on top of circuit board 24 within the frame.

Printed circuit board 23 is preferably a rigid structure having the parallel strip conductors 2a–2d formed on one side of a rigid dielectric sheet 29. Input terminal pins 32a–32d are electrically connected to one end of strips 2a–2d, respectively, for making electrical connection to external circuitry. The pins 32a–32d are electrically insulated from the frame by the dielectric spacers 33a–33d, respectively.

Printed circuit board 24 is preferably a flexible member having the parallel strip conductors 3e–3h formed on the side of a flexible dielectric sheet 34 facing the conductors 2. The circuit boards 23 and 24 are oriented in the frame 26 to make the strips 2 and 3 orthogonal as illustrated in the FIGURES. Thus, conductors 2 and 3 cross over each other at the points 35 as shown in FIG. 2. A crossover point is defined as the area over which a pair of conductors 2 and 3 overlap. The conductors 2 and 3 are normally electrically insulated from each other at the crossover points by the pad 25 as described more fully hereinafter. Output terminal pins 36e–36h, which are insulated from the frame by dielectric spacers 37e–37h, are connected to one end of strips 3e–3h, respectively, for making electrical connection to external circuitry.

Pad 25 is preferably made of a memoryless resilient dielectric material such as sponge rubber. The pad normally electrically insulates the conductors 2 and 3 from each other, the height of the pad being equal to the spacing between these conductors when the resilient pad is relaxed. An aperture 38 is formed in the pad at each crossover point. The cross sections of the apertures are preferably circular, although they may also be of other shapes. The switch is closed at a selected crossover point 39, for example, by an officer in the patrol car pressing with his finger on the map at this point to compress the pad until conductors 2d and 3f are in physical contact to make electrical connection therebetween. This causes pins 32d and 36f, and associated circuitry to be electrically connected through the aperture at this crossover point.

Alternatively, pad 25 may be made of a non-resilient material such as mylar. In this switch the diameter of the cylindrical apertures 38 are sufficiently large that a flexible conductor 3 deforms into an aperture to contact an associated conductor 2 when an external force is applied at the associated crossover point.

The horizontal strips 2a–2d are connected through sensors 4a–4d, respectively, and line 41 to a ground reference potential, see FIG. 1. The vertical conductors 7e–7h are connected through sensors 5e–5h and line 42 to the source voltage +V. The outputs of all of the sensors are coupled on associated lines 43a–43h to the decoder circuit.

The sensors may, by way of example, each comprise the parallel combination of a resistor and threshold detector connected in series with an associated strip conductor of switch 1. The detector monitors the voltage developed across the resistor for producing a binary output signal representing the continuity states at associated crossover points. By way of example, when the strips at associated crossover points are spaced apart, no current flows through the resistor and the detector output is low (a binary 0) indicating that the switch is open. When the strips are electrically connected at an associated crossover point, current flows through and a voltage is developed across the resistor. When this voltage exceeds a prescribed threshold level, the detector changes operating states such that the output thereof is high (a binary 1) indicating that the switch is closed at one of the crossover points associated with that sensor.

The outputs of sensors 5 are also connected to OR gate 14 which controls the operation of clock-control circuit 15. Circuit 15 produces a control pulse which is applied on line 44 to the buffer register, on line 45 to the auxiliary data circuit, and on line 46 to monostable multivibrator 47 for illuminating lamp 48 for a predetermined time interval. Circuit 15 also produces clock pulses which are applied on line 49 to the shift register.

Decoder circuit 8 may comprise logic circuitry for converting the binary signals (logic levels 1 and 0) from the sensors to a convenient form for transmission to the monitor facility. By way of example, circuit 8 may convert the binary output signals of the sensors to binary numbers that are applied to the buffer register. This operation of circuit 8 decreases the number of bits that are required to represent the binary information from the sensors. Auxiliary information such as: a binary word representing the identity (ID) of the particular patrol car having the map and transmitting its location; a binary synchronization code word; and, parity bits are produced by auxiliary data circuit 16 and applied on lines 50 to the buffer register.

Logic circuit 19 may be a computer that is programmed to decode the binary output signal of the shift register. Alternatively, decoder 8 and circuit 19 may comprise logic circuits designed in accordance with the teachings of texts such as Logic Design of Digital Computers by M. Phister, Jr., John Wiley & Sons, Inc.

Display 20 in the monitor facility preferably comprises a map similar to the map overlay 27 on the matrix switch. Lamps 53 are secured to the display map at locations corresponding to each of the crossover points of switch 1. Alternatively, the display 20 may comprise a cathode ray tube on which a phrase designating the ID of a patrol car and its location is printed.

In operation, the output of each of the sensors is low (a logic level 0) when none of the strips are connected at the crossover points. In this state, control circuit 15 is deactivated and a binary signal is not transmitted by transceiver 11 to the monitor facility. Thus, none of the lamps 53 on display 20 is illuminated. Consider that the location of the car is found to correspond to the crossover point 39 on the overlay map 27. This location information is selected for transmission to the monitor facility by a police officer pressing his finger firmly on the map at point 39. This compresses the pad 25 and causes conductors 2d and 3f to be electrically connected through the associated aperture so that an electric current is padded through line 41, sensor 4d, conductors 2d and 3f, sensor 5f and line 42. When the current passed by sensors 4d and 5f exceeds a prescribed threshold value, the output logic levels of only these sensors goes high (a logic level 1). The output of each of the other sensors is low (a binary 0). This combination of binary logic levels on lines 43 is a unique representation of the location of the vehicle.

Since the output of sensor 5f is now high, OR gate 14 changes operating states to activate clock-control circuit 15 for a prescribed time interval. Circuit 15 produces a control pulse that causes circuit 16 to enter the ID of the patrol car into the buffer register. This control pulse also causes monostable multivibrator 47 to change operating states to illuminate lamp 48 for a predetermined time interval. This tells the officer in the patrol car that the binary message representing the selected location was transmitted to the monitor facility. The buffer register is responsive to the control pulse for entering the contents thereof into the shift register and blocking subsequent input signals from the latter.

After a predetermined time delay, circuit 15 produces clock pulses on line 49 which cause the contents of the shift register to be serially advanced on line 54 to the transceiver 11 for transmission to the monitor facility. The contents of the shift register is recirculated on line 55 in order to transmit the binary signal a prescribed number of times.

The binary signal received by transceiver 18 is processed by logic circuit 19 which produces an output signal on lines 56 that illuminates the lamp 53', corresponding to the crossover point 39, on the map-display 20 to indicate the location of the car. Circuit 19 also produces a code signal on line 57 that is automatically transmitted by transceiver 18; is addressed to the patrol car; and, indicates that the binary vehicle location signal from the patrol car was received. Transceiver 11 is responsive to this code signal for producing a signal on line 58 that biases monostable multivibrator 59 to change conduction states to illuminate lamp 60 for a predetermined time interval. This tells the officer in the patrol car that his transmitted binary vehicle location message was received at the monitor facility.

Changes, modifications and improvements may be made to the above identified preferred embodiment of the invention without departing from the spirit of the invention. By way of example, the matrix switch 1 may comprise as many conductors 2 and 3, and of whatever geometric pattern, as is desired for a particular application. Also, the conductive patterns and circuit boards supporting them may be three dimensional. Further, although this invention is described as a system for providing an indication of the location of a police patrol car, it has use in other applications and with other types of objects including a human carrying the system. The scope of this invention is therefore to be determined from the appended claims rather than the above detailed description.

What is claimed is:

1. Apparatus for identifying the instantaneous location of a mobile unit at a remote station,
   said mobile unit comprising
   a first map overlay disposed in a first plane and depicting a geographic area in which said mobile unit is located,
   a compressive-type switch under said map overlay actuatable by finger-type force applied to said overlay at the point representative of the location of said mobile unit, said switch comprising
   a first set of spaced parallel conductors in a second plane parallel to said first plane and a second set of spaced parallel conductors in a third plane parallel to and spaced from said second plane, the conductors of the first set extending transversely of the conductors of the second set and defining therewith crossover points at which electrical contact is made between conductors of the two sets in response to said finger-type compressive force, means for electrically energizing said first set of conductors, each conductor of the second set being energized only by the conductor of the first set in electrical contact therewith, sensor means responsive to the electrical continuity of each conductor of said first and second sets and producing a first binary digit for each conductor in contact with another conductor and a second binary digit for each conductor not in contact with another conductor, means responsive to said first and second binary digits for generating a binary word uniquely defining the selected position of contact between conductors of said first and second sets, a radio frequency transmitter, and means responsive to said binary word for modulating said transmitter to transmit same to said remote station, said remote station comprising means for receiving said binary word, and display means responsive to said receiving means comprising a plurality of illuminatable points adapted to be illuminated to form a pattern corresponding to the pattern of said crossover points of said mobile unit switch with one of said illuminatable points at each position corresponding to a crossover point, and a second map overlay substantially the same as said first map overlay optically superimposed on said illuminatable points and oriented relative thereto as said first map overlay is oriented relative to the crossover points of said switch whereby a finger-type compressive force applied to one location on said first map overlay causes illumination of a point at the same location on said second map overlay.

2. Apparatus according to claim 1 in which said illuminatable points comprise light emitting elements.

3. Apparatus according to claim 1 in which said illuminatable points comprise portions of the screen of a cathode ray tube.

4. Apparatus according to claim 1 in which said mobile unit includes means for generating a second binary word representing the identity of the particular transmitting mobile unit, indication means responsive to said transmitting means for indicating transmission of said binary words, said remote station having a transmitter responsive to said receiving means for transmitting an acknowledgment signal upon reception of said binary words, the indicator means at said mobile unit also being responsive to said acknowledgment signal for indicating reception by the remote station of said binary words.

* * * * *